(12) United States Patent
Lu et al.

(10) Patent No.: US 12,260,098 B2
(45) Date of Patent: Mar. 25, 2025

(54) MEMORY CHANNEL DISABLEMENT

(71) Applicant: Micron Technology, Inc., Boise, ID (US)

(72) Inventors: Yang Lu, Boise, ID (US); Yu-Sheng Hsu, San Jose, CA (US); Kang-Yong Kim, Boise, ID (US); Ke Wei Chan, Zhudong Township (TW)

(73) Assignee: Micron Technology, Inc., Boise, ID (US)

( * ) Notice: Subject to any disclaimer, the term of this patent is extended or adjusted under 35 U.S.C. 154(b) by 205 days.

(21) Appl. No.: 17/944,572

(22) Filed: Sep. 14, 2022

(65) Prior Publication Data

US 2024/0086090 A1  Mar. 14, 2024

(51) Int. Cl.
  *G06F 3/06*  (2006.01)
(52) U.S. Cl.
  CPC ............ *G06F 3/0629* (2013.01); *G06F 3/061* (2013.01); *G06F 3/0673* (2013.01)

(58) Field of Classification Search
  CPC ....... G06F 3/0629; G06F 3/061; G06F 3/0673
  See application file for complete search history.

(56) References Cited

U.S. PATENT DOCUMENTS

| | | | |
|---|---|---|---|
| 5,309,446 | A | 5/1994 | Cline et al. |
| 6,882,171 | B2 | 4/2005 | Ong |
| 8,468,417 | B2 | 6/2013 | Asnaashari et al. |
| 2004/0136218 | A1* | 7/2004 | Magnavacca ........ G11C 7/1078 365/51 |
| 2019/0361516 | A1* | 11/2019 | Bhattacharyya ...... G06F 3/0625 |
| 2020/0183622 | A1* | 6/2020 | Hubbard ................. G06F 3/061 |
| 2021/0173773 | A1* | 6/2021 | Pearson ................ G06F 11/073 |
| 2021/0286752 | A1 | 9/2021 | Modukuri et al. |

\* cited by examiner

*Primary Examiner* — Gary W. Cygiel
(74) *Attorney, Agent, or Firm* — Brooks, Cameron & Huebsch, PLLC (57) ABSTRACT

An apparatus can include memory devices and a memory controller coupled to the memory devices via memory channels. The memory channels can disable a first memory channel associated with a first memory die in a respective memory chip of a memory device and perform a memory operation via a second memory channel involving a second memory die in the respective memory chip.

19 Claims, 5 Drawing Sheets

450

452 — IDENTIFY A MEMORY CHIP AS BEING RELIABILITY PRONE

454 — DISABLE A FIRST MEMORY CHANNEL ASSOCIATED WITH A FIRST MEMORY DIE INCLUDED IN THE MEMORY CHIP

456 — PERFORM A MEMORY OPERATION VIA A SECOND MEMORY CHANNEL INVOLVING A SECOND MEMORY DIE INCLUDED IN THE MEMORY CHIP

MEMORY CHANNEL DISABLEMENT

TECHNICAL FIELD

The present disclosure relates generally to semiconductor memory and methods, and more particularly, to apparatuses, systems, and methods for memory channel disablement.

BACKGROUND

Memory devices are typically provided as internal, semiconductor, integrated circuits in computers or other electronic systems. There are many different types of memory including volatile and non-volatile memory. Volatile memory can require power to maintain its data (e.g., host data, error data, etc.) and includes random access memory (RAM), dynamic random access memory (DRAM), static random access memory (SRAM), synchronous dynamic random access memory (SDRAM), and thyristor random access memory (TRAM), among others. Non-volatile memory can provide persistent data by retaining stored data when not powered and can include NAND flash memory, NOR flash memory, ferroelectric random access memory (FeRAM), and resistance variable memory such as phase change random access memory (PCRAM), resistive random access memory (RRAM), and magnetoresistive random access memory (MRAM), such as spin torque transfer random access memory (STT RAM), among others.

Memory devices may be coupled to a host (e.g., a host computing device) to store data, commands, and/or instructions for use by the host while the computer or electronic system is operating. For example, data, commands, and/or instructions can be transferred between the host and the memory device(s) during operation of a computing or other electronic system. A controller may be used to manage the transfer of data, commands, and/or instructions between the host and the memory devices.

DETAILED DESCRIPTION

Systems, apparatuses, and methods related to memory channel disablement are described. A memory controller can be configured to perform memory channel disablement. The memory controller can be within a memory system, which can be a memory module, a storage device, or a hybrid of a memory module and a storage device.

A memory device can include memory chips. For instance, a memory device can include a multi-chip package (MCP) including a plurality of memory chips. A memory chip can include memory dice such as two memory dice, four memory dice, etc. A memory die can be coupled by a respective memory channel to the memory controller. For instance, each memory chip can include two or more memory die that can be coupled to two or more respective memory channels of a memory controller, among other possibilities.

As described herein, the memory controller can be configured to disable a respective memory channel associated with respective memory die in a memory chip. The memory controller can disable a memory channel based on reliability testing of a memory chip and/or memory die. For instance, initial reliability testing, as described herein, of memory chips at a point of manufacture may indicate differing degrees of reliability of the memory chips. The initial reliability testing can indicate that a memory chip and/or memory die does not satisfy a reliability criterion and thus can be deemed to be reliability prone. For instance, due to manufacturing variations, etc. a small subset of a total quantity of total memory chips which are manufactured may be deemed reliability prone based on reliability testing thereof.

Use of a reliability prone memory chip in a memory device may be perceived to hinder memory device performance even though a portion of dice in the reliability prone memory chip may be satisfactory (e.g., not reliability prone). Thus, some previous approaches may entirely discard (e.g., dispose of) reliability prone memory chips. Disposal of the reliability prone memory chips may increase a manufacturing cost associated with a memory device, create logistical difficulties, and/or have an negative environmental impact.

Aspects of the present disclosure address the above and other deficiencies by employing memory channel disablement. Notably, embodiments herein permit a portion of a reliability prone memory chip to be disabled. For instance, a first memory channel associated with a first memory die in a respective memory chip of a memory device can be disabled and a memory operation can be performed via a second memory channel involving a second memory die in the respective memory chip. For example, memory channel circuitry, as described herein, can be configured to disable at least one memory channel. As such, the first memory die in the individual memory chip can be disabled, yet the second memory die can be enabled (or remain enabled) to permit memory operations involving the second memory die.

Thus, unlike other approaches such as those that entirely discard a reliability prone memory chips, the approaches herein account for a reliability prone portion (e.g., a reliability prone memory die) of a reliability prone memory chip and thereby permit inclusion and use of the reliability prone memory chip in a memory device. Memory channel disablement as described herein can thereby increase a manufacturing yield of memory chips (e.g., increase a percentage of manufactured memory chips which are suitable for inclusion in a memory device). Accordingly, approaches herein can reduce a manufacturing cost associated with a memory device, etc. Moreover, by disabling a reliability prone portion (e.g., a respective memory channel associated with a respective memory die) of the memory chip approaches herein can still realize a desired degree of performance of the memory device such as having a permissible amount of latency and/or a suitable quantity of memory/storage.

As used herein, the singular forms "a", "an", and "the" include singular and plural referents unless the content clearly dictates otherwise. Furthermore, the word "may" is used throughout this application in a permissive sense (i.e., having the potential to, being able to), not in a mandatory sense (i.e., must). The term "include," and derivations thereof, mean "including, but not limited to." The term "coupled" means directly or indirectly connected. It is to be understood that data can be transmitted, received, or exchanged by electronic signals (e.g., current, voltage, etc.) and that the phrase "signal indicative of [data]" represents the data itself being transmitted, received, or exchanged in a physical medium.

The figures herein follow a numbering convention in which the first digit or digits correspond to the drawing figure number and the remaining digits identify an element or component in the drawing. Similar elements or components between different figures may be identified by the use of similar digits. For example, 110 may reference element "10" in FIG. 1, and a similar element may be referenced as 210 in FIG. 2. Analogous elements within a Figure may be referenced with a hyphen and extra numeral or letter. See, for example, elements 130-1, 130-2, 130-N in FIG. 1. Such analogous elements may be generally referenced without the hyphen and extra numeral or letter. For example, elements 130-1, 130-2, 130-N may be collectively referenced as 130. As used herein, the designators "M" and "N" and "X", particularly with respect to reference numerals in the drawings, indicates that a number of the particular feature so designated can be included. As will be appreciated, elements shown in the various embodiments herein can be added, exchanged, and/or eliminated so as to provide a number of additional embodiments of the present disclosure. In addition, as will be appreciated, the proportion and the relative scale of the elements provided in the figures are intended to illustrate certain embodiments of the present invention and should not be taken in a limiting sense.

Figure 1:
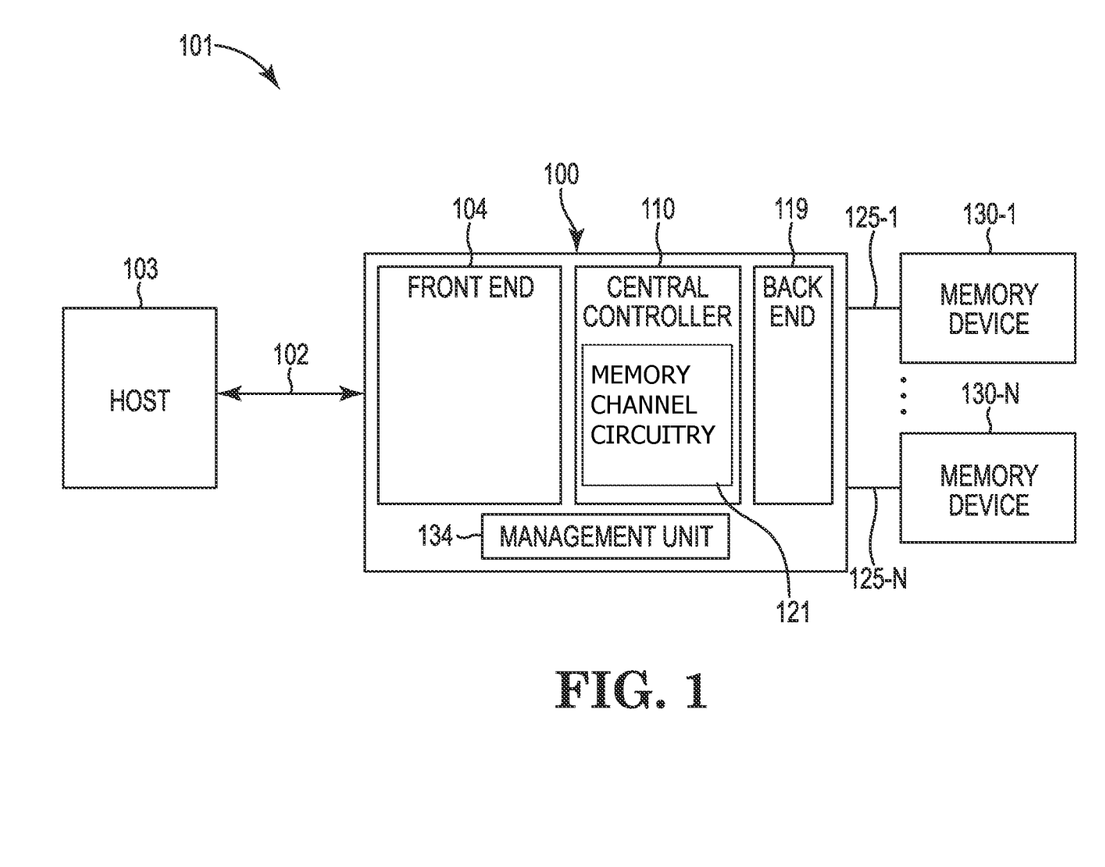
FIG. 1 is a block diagram of a computing system including a memory controller in accordance with a number of embodiments of the present disclosure.

FIG. 1 is a block diagram of a computing system 101 including a memory controller 100 in accordance with a number of embodiments of the present disclosure. The memory controller 100 includes a front end portion 104, a central controller portion 110, and a back end portion 119. The computing system 101 includes a host 103 and memory devices 130-1, . . . , 130-N coupled to the memory controller 100. The computing system 101 can be, for example, a high performance computing (HPC) data center among various other types of computing systems (e.g., servers, desktop computers, laptop computers, mobile devices, etc.).

Although not shown in FIG. 1, the front end portion 104 can include a physical layer (PHY) and a front end controller for interfacing with the host 103 over a bus 102, which can include a number of input/output (I/O) lanes. The bus 102 can include various combinations of data, address, and control busses, which can be separate busses or one or more combined busses. In at least one embodiment, the interface between the memory controller 100 and the host 103 can be a peripheral component interconnect express (PCIe) physical and electrical interface operated according to a compute express link (CXL) protocol. As non-limiting examples, the bus 102 can be a PCIe 5.0 interface operated in accordance with a CXL 2.0 specification or a PCIe 6.0 interface operated in accordance with a CXL 3.0 specification.

CXL is a high-speed central processing unit (CPU)-to-device and CPU-to-memory interconnect designed to accelerate next-generation data center performance. CXL technology maintains memory coherency between the CPU memory space and memory on attached devices such as accelerators, memory buffers, and smart I/O devices, which allows resource sharing for higher performance, reduced software stack complexity, and lower overall system cost.

CXL is designed to be an industry open standard interface for high-speed communications, as accelerators are increasingly used to complement CPUs in support of emerging applications such as artificial intelligence and machine learning. CXL technology is built on the PCIe infrastructure, leveraging PCIe physical and electrical interfaces to provide advanced protocol in areas such as input/output (I/O) protocol, memory protocol (e.g., initially allowing a host to share memory with an accelerator), and coherency interface. CXL provides protocols with I/O semantics similar to PCIe (e.g., CXL.io), caching protocol semantics (e.g., CXL.cache), and memory access semantics (CXL.mem). CXL can support different CXL device types (e.g., Type 1, Type 2, and Type 3) supporting the various CXL protocols. Embodiments of the present disclosure are not limited to a particular CXL device type.

The central controller 110 can be responsible for controlling various operations associated with executing memory access requests (e.g., read commands and write commands) from the host 103. For example, although not shown in FIG. 1, the central controller 110 can include a cache and various error circuitry (e.g., error detection and/or error correction circuitry) capable of generating error detection and/or error correction data for providing data reliability among other RAS functionality in association with writing data to and/or reading data from the memory devices 130. As described further herein, such error detection and/or correction circuitry can include cyclic redundancy check (CRC) circuitry, error correcting code (ECC) circuitry, redundant array of independent disks (RAID) circuitry, and/or "chip kill" circuitry, for example. Also, as described further below, the cache can be implemented as a plurality of independent caches (e.g., a separate cache per channel group).

The back end portion 119 can include a number of memory channel controllers (e.g., media controllers) and a physical (PHY) layer that couples the memory controller 100 to the memory devices 130. As used herein, the term "PHY layer" generally refers to the physical layer in the Open Systems Interconnection (OSI) model of a computing system. The PHY layer may be the first (e.g., lowest) layer of the OSI model and can be used transfer data over a physical data transmission medium.

In various embodiments, the physical data transmission medium includes memory channels 125-1, . . . , 125-N. The memory channels 125 can be, for example, 16-bit channels each coupled to 16-bit (e.g., ×16) devices, to two 8-bit (×8) devices; although embodiments are not limited to a particular back end interface. In some embodiments each memory channel has a same channel width. For instance, each memory channel can have a 8-bit width (e.g., be a 8-bit channel) or can have a 16-bit width (e.g., be a 16-bit channel). As another example, the channels 125 can each also include a two pin data mask inversion (DMI) bus, among other possible bus configurations. The back end portion 119 can exchange data (e.g., user data and error detection and/or correction data) with the memory devices 130 via the physical pins corresponding to the respective memory channels 125. As described further herein, in a number of embodiments, the memory channels 125 can be organized as a number of channel groups, with the memory channels of each group being accessed together in association with executing various memory access operations and/or error detection and/or correction operations.

The memory devices 130 can be, for example, dynamic random access memory (DRAM) devices operated according to a protocol such as low-power double data rate (LPDDRx), which may be referred to herein as LPDDRx DRAM devices, LPDDRx memory, etc. The "x" in LPDDRx refers to any of a number of generations of the protocol (e.g., LPDDR5). However, embodiments are not limited to a particular type of memory device 130. For example, the memory devices 130 can be FeRAM devices.

In some embodiments, the memory controller 100 can include a management unit 134 to initialize, configure, and/or monitor characteristics of the memory controller 100. The management unit 134 can include an I/O bus to manage out-of-band data and/or commands, a management unit controller to execute instructions associated with initializing, configuring, and/or monitoring the characteristics of the memory controller, and a management unit memory to store data associated with initializing, configuring, and/or monitoring the characteristics of the memory controller 100. As used herein, the term "out-of-band" generally refers to a transmission medium that is different from a primary transmission medium of a network. For example, out-of-band data and/or commands can be data and/or commands transferred to a network using a different transmission medium than the transmission medium used to transfer data within the network.

As described further below in association with FIGS. 3A and 3B various embodiments of the present disclosure can include implementing memory channel disablement via memory channel circuitry 121. The memory channel circuitry 121 can be included in the central controller portion 110 the back end portion 119, or a combination thereof. For instance, as illustrated in FIG. 1, the memory channel circuitry 121 can be included in the central controller portion 110.

Figure 2:
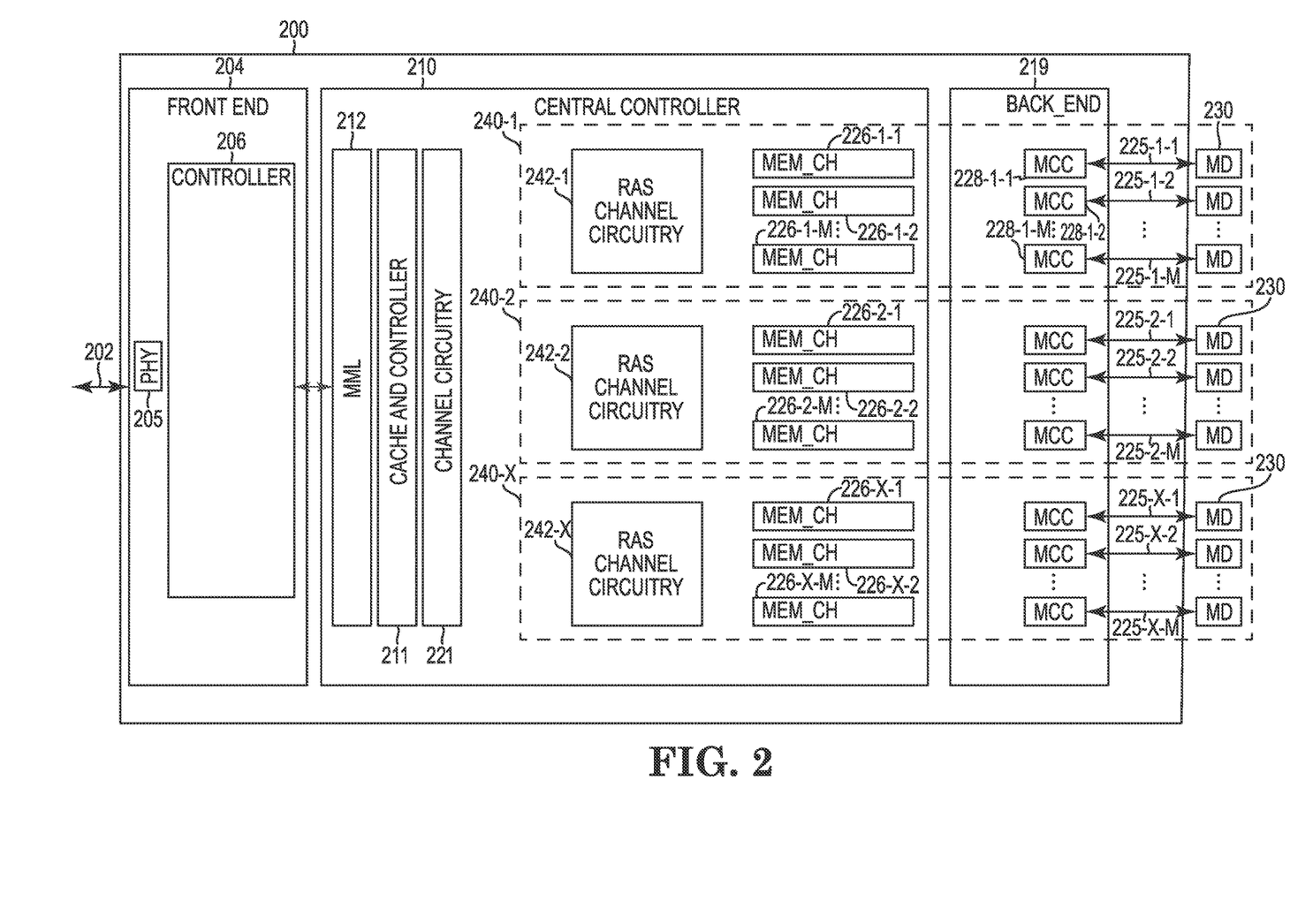
FIG. 2 is a block diagram of a memory controller coupled to a plurality of memory devices.

FIG. 2 is a block diagram of a memory controller 200 coupled to memory devices 230. As shown in FIG. 2, the memory controller 200 includes a front end portion 204, a central portion 210, and a back end portion 219. The memory controller 200 can be a controller such as controller 100 described in FIG. 1.

The front end portion 204 includes a front end PHY 205 for interfacing with a host via communication link 202, which can be a CXL link, for example. The front end 204 includes a front end controller 206 to manage the interface and communicate with the central controller 210. In embodiments in which the link 202 is a CXL link, the front end controller 206 is configured to receive (e.g., from a host) memory access requests, according to a CXL protocol, directed at the memory devices 230, and to provide (e.g., to a host) memory access responses, according to a CXL protocol, corresponding to memory access requests.

The memory controller 200 is coupled to the memory devices 230 via a number of memory channels 225. In this example, the memory channels 225 are organized as a number of channel groups 240-1, 240-2, . . . , 240-X. In this example, each channel group 240 comprises "M" memory channels 225. For instance, channel group 240-1 comprises memory channels 225-1-1, 225-1-2, . . . , 225-1-M, channel group 240-2 comprises memory channels 225-2-1, 225-2-2, . . . , 225-2-M, and channel group 240-X comprises memory channels 225-X-1, 225-X-2, 225-X-M. Although each channel group is shown as comprising a same quantity of memory channels 225, embodiments are not so limited.

Although each of the memory channels 225 is illustrated as corresponding to a respective memory device 230, embodiments are not so limited. Rather, in some embodiments, each memory device 230 can have at least memory channels associated therewith as described herein in FIGS. 3A and 3B.

The back end portion 219 of the memory controller 200 includes memory channel controllers (MCC) 228 for interfacing with memory devices 230 corresponding to the respective memory channels 225. As shown in FIG. 2, the memory channel controllers 228-1-1, 228-1-2, . . . , 228-1-M corresponding to channel group 240-1 are coupled to the memory devices 230 via respective memory channels 225-1-1, 225-2-2, . . . , 225-1-M. Although not shown in FIG. 2, the back end 219 includes a PHY memory interface for coupling to the memory devices 230. Examples of PHY memory interface are shown in greater detail in FIGS. 3A and 3B.

The respective memory channels 225 of the channel groups 240-1, 240-2, . . . , 240-X are operated together for purposes of one or more RAS schemes. Accordingly, the channel groups 240 may be referred to as "RAS channels" or "RAS channel groups". In this example, the channel groups 240-1, 240-2, . . . , 240-X include respective error circuitry (RAS CHANNEL CIRCUITRY) 242-1, 242-2, . . . , 242-X. The error circuitry 242 can include various circuitry for error detection and/or error correction, which can include data recovery. The error circuitry 242 can also include CRC circuitry, ECC, circuitry, RAID circuitry and/or chip kill circuitry, including various combinations thereof. The channel groups 240-1, 240-2, . . . , 240-X can be operated independently by the central controller 210 such that memory access requests and/or error operations can be separately (and concurrently) performed on the memory devices 230 corresponding to the respective channel groups 240.

The term "chip kill" generally refers to a form of error correction that protects memory systems (e.g., the computing system 101 shown in FIG. 1) from any single memory device 230 (chip) failure as well as multi-bit error from any portion of a single memory chip. Chip kill circuitry can increase the stability of the data and correct errors in the data with a desired chip kill protection collectively across subsets of the memory devices 230 (e.g., subsets corresponding to respective channel groups 240).

An example chip kill implementation for channel groups 240 comprising eleven memory channels 225 (e.g., "M"=11) corresponding to a bus width of 176 bits (16 bits/channel×11 channels) can include writing data to memory devices 230 of eight of the eleven memory channels 225 and parity data to memory devices 230 of three of the eleven memory channels 225. Four codewords can be written, each composed of eleven four-bit symbols, with each symbol belonging to a different channel/device. A first codeword can comprise the first four-bit symbol of each memory device 230, a second codeword can comprise the second four-bit symbol of each memory device 230, a third codeword can comprise the third four-bit symbol of each memory device 230, and a fourth codeword can comprise the fourth four-bit symbol of each memory device 230.

The three parity symbols can allow the chip kill circuitry (e.g., 242) to correct up to one symbol error in each codeword and to detect up to two symbol errors. If instead of adding three parity symbols, only two parity symbols are added, the chip kill circuitry can correct up to one symbol error but only detect one symbol error. In various embodiments, the data symbols and the parity symbols can be written or read concurrently from memory devices of the eleven memory channels (e.g., 225-1-1 to 225-1-11). If every bit symbol in a die fails, only the bit symbols from that memory device 230 in the codeword will fail. This allows memory contents to be reconstructed despite the complete failure of one memory device 230. The aforementioned chip kill operation is considered to be "on-the-fly correction" because the data is corrected without impacting performance by performing a repair operation. Embodiments are not limited to the particular example chip kill operation described above. In contrast to chip kill operations that may not involve a repair operation, various RAID approaches are considered to be "check-and-recover correction" because a repair process is initiated to recover data subject to an error. For example, if an error in a symbol of a RAID stripe is determined to be uncorrectable, then the corresponding data can be recovered/reconstructed by reading the remaining user data of the stripe and XORing with the stripe's corresponding parity data.

As shown in FIG. 2, each of the channel groups 240 can include memory channel datapath circuitry (MEM CH) 226 associated with the corresponding memory channels 225 of a particular channel group 240. For example, channel group 240-1 includes memory channel datapath circuitry 226-1-1, 226-1-2, . . . , 226-1-M corresponding to respective channels 225-1-1, 225-1-2, . . . , 225-1-M. Similarly, channel group 240-2 includes memory channel datapath circuitry 226-2-1, 226-2-2, . . . , 226-2-M corresponding to respective channels 225-2-1, 225-2-2, . . . , 225-2-M, and channel group 240-X includes memory channel datapath circuitry 226-X-1, 226-X-2, 226-X-M corresponding to respective channels 225-X-1, 225-X-2, . . . , 225-X-M.

The datapath circuitry 226 can include error circuitry corresponding to error detection or error correction on a particular memory channel 225. For instance, the datapath circuitry 226 might include CRC circuitry or ECC circuitry. That is, in contrast to the error circuitry 242, which can be associated with multiple channels 225 within the channel group 240, the error circuitry of datapath circuitry 226 can be associated with or dedicated to a particular memory channel 225.

As shown in FIG. 2, the central controller 210 can include a media management layer (MML) 212 that can be used to translate memory access requests in accordance with a particular protocol (e.g., CXL compliant requests) into a protocol compliant with the particular memory controller 200 and/or particular type of memory media (e.g., memory devices 230). Unlike the controller 100 shown in FIG. 1, which did not illustrate a cache in the central controller 110, the central controller 210 includes a cache 211 and an associated cache controller. The cache 211 can be used, for example, to temporarily store data frequently accessed (e.g., by a host).

As described further below, various embodiments of the present disclosure can provide memory channel circuitry 221 (channel circuitry). The memory channel circuitry 221 can include circuitry such as gates, invertors, and/or multiplexors, etc. to permit at least one memory channel to be selectively disabled, as described herein. For instance, the memory channel circuitry 221 can disable at least one memory channel associated with a memory die included in memory chip in a memory device based on reliability testing of the memory chip, as described herein.

As used herein, a "disabled" memory channel refers to a memory channel that is logically (e.g., based on a signal from a logical gate) and/or physical configured (e.g., switched via a multiplexor) to not permit memory operations involving the memory channel. For instance, at least one memory die in a reliability prone memory chip can be associated with a disabled memory channel so the at least one memory die is not used for memory operations. Disabling the entire channel associated with a chip can provide various benefits such as reduced power consumption, ease of memory channel allocation/tracking, ease of disablement of the chip, etc. that extend beyond merely disabling (e.g., physically disabling) the chip itself. Moreover, disabling the chip itself directly entails initial time intensive and costly testing to determine which exact chip is reliability prone, whereas memory channel disablement as detailed herein can be performed in the absence of such time/cost expensive testing.

As used herein, an "enabled" memory channel refers to a memory channel that is logically and/or physically configured to permit memory operations involving the memory channel and a memory die associated with the memory channel. For instance, at least one memory die in a reliability prone memory chip can be associated with an enabled memory channel so the at least one memory die can be invoked for memory operations.

Figure 3A:
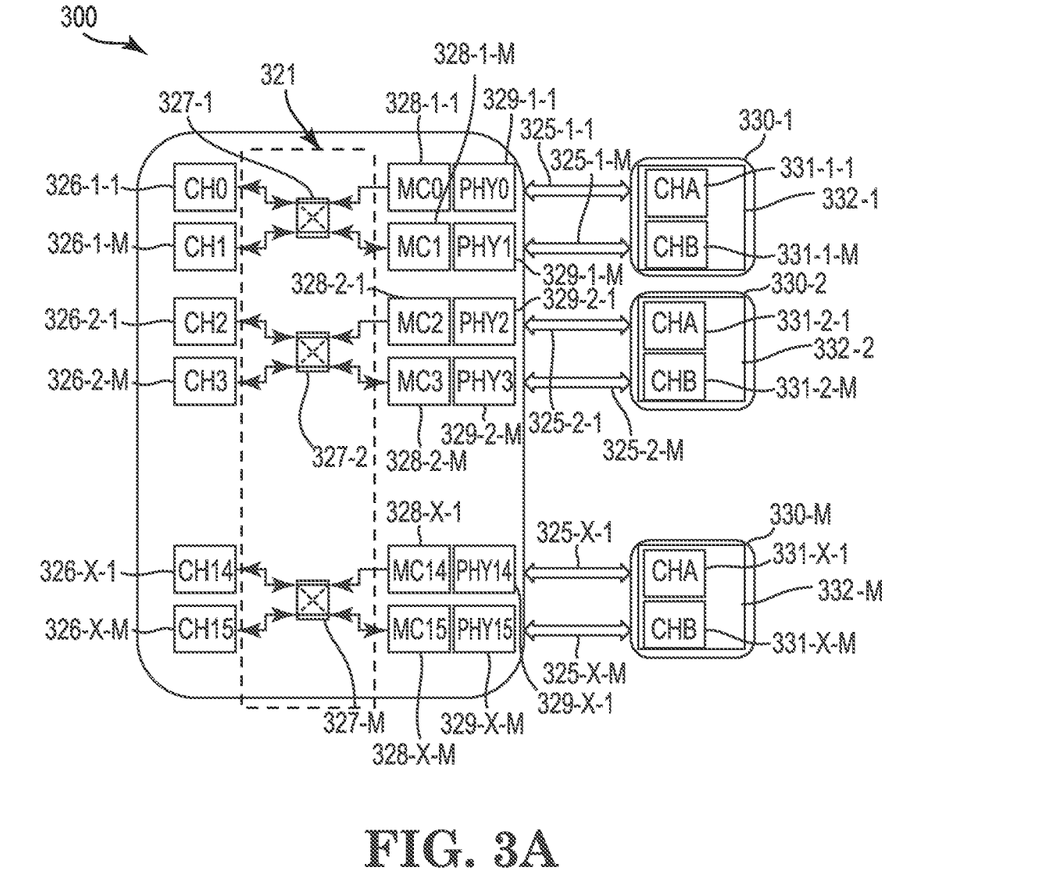
FIG. 3A is a block diagram of a portion of a memory controller having an example of memory channel circuitry in accordance with a number of embodiments of the present disclosure.

As described in FIG. 3A, the memory channel circuitry 221 can include a multiplexor. For example, a pair or group of channels can have a corresponding multiplexor configured to selectively disable at least one memory channel. However, embodiments are not so limited. Rather as described in FIG. 3B, the memory channel circuitry 221 can include a gate (e.g., in the absence of a multiplexor). For instance, each memory channel can have a corresponding gate, as described in FIG. 3B.

In some embodiments, a sub-group can be a designated sub-group that is configured to selectively disable the at least one memory channel in the designated sub-group, as described herein. In such embodiments, other sub-groups in the channel group may not be configured to selectively disable a memory channel. For instance, an individual channel group (e.g., an individual RAS channel group) can include an individual sub-group that is designated to selectively disable a memory channel in the individual sub-group, whereas the remaining sub-groups in the individual channel group are not configured to selectively disable a memory channel.

Thus, in some embodiments, some but not all channel groups and/or some but not all of the sub-groups can be configured to selectively disable a memory channel. For instance, an individual sub-group of memory channels and/or an individual memory channel in the individual sub-group can be configured to be selectively disabled, among other possibilities. In some embodiments, the memory channel circuitry 221 is configured to disable at most one memory channel in the respective RAS channel group and/or disable at most one memory channel in a sub-group in the respective RAS channel group. For instance, an individual memory channel or an individual sub-group can be configured to be disabled, while the remainder of the memory channels and sub-groups are enabled or remain enabled.

Having some but not all channel groups, sub-group, and/or memory channels configured to be disabled can reduce an amount of memory channel circuitry (e.g., multiplexors or logic gates, etc.) included in a memory controller and thus can simplify manufacture and reduce cost of the memory controller, and yet may be sufficient to incorporate a small sub-set of memory chips that are reliability prone into memory devices. However, the disclosure is not so limited. Rather in some embodiments, each channel group, each sub-group, and/or each memory channel can be configured to be disabled.

In some embodiments, the memory controller 300 can disable a memory channel prior to receipt of signaling indicative of a memory request from a host. For instance, a first memory channel or other memory channel can be disabled prior to receipt of signaling indicative of a memory request from a host. Disabling a memory channel prior to receipt of signaling indicative a memory request can prevent a memory request invoking a portion (e.g., a reliability prone memory die) of a chip reliability prone chip from occurring and thereby can promote aspects of memory channel disablement described herein. For instance, a memory channel associated with a memory device or memory chip that is indicated as being reliability prone based on initial reliability testing can be disabled responsive to coupling of the memory controller to the memory chip or the memory device, among other possibilities.

FIG. 3A is a block diagram of a portion of a memory controller 300 having an example of memory channel circuitry 321 in accordance with a number of embodiments of the present disclosure.

The quantity of the memory channel data path circuitry, the MCC, the PHY memory interfaces, the memory devices, and/or the memory die, among other elements illustrated in FIG. 3A (and similarly FIG. 3B), can be varied. For instance, the memory controller 300 can include additional memory channel data path circuitry, MCC, PHY, memory devices, and/or memory dice similar to the quantity of elements shown in FIG. 2.

As shown in FIG. 3A, each of the channel groups can include memory channel datapath circuitry (MEM CH) 326 associated with the corresponding memory channels 325. Similar to FIG. 2, each of the memory channels can correspond to a particular channel group such as a RAS channel group.

For instance, the portion of the memory controller 300 can include a first memory channel datapath circuitry (CH0) 326-1-1 associated with a first memory channel 325-1-1 and a second memory channel datapath circuitry (CH1) 326-1-M associated with a second memory channel 325-1-M. Similarly, a third memory channel datapath circuitry (CH2) 326-2-1 can be associated with a third memory channel 325-2-1, a fourth memory channel datapath circuitry (CH3) 326-2-M can be associated with a fourth memory channel 325-2-M, a fifth memory channel datapath circuitry (CH14) 326-X-1 can be associated with a fifth memory channel 325-X-1, and a sixth memory channel datapath circuitry (CH15) 326-X-M can be associated with a sixth memory channel 325-X-M. As mentioned, various other components such as additional memory channels (e.g., CH4-CH13) can be included in the memory controller 300.

The datapath circuitry 326 can be coupled via a multiplexor to a corresponding memory channel controller (MCC) 328 and PHY memory interface 329. For instance, the first memory channel datapath circuitry (CH0) 326-1-1 and second memory channel datapath circuitry (CH1) 326-1-M can be coupled via a first multiplexor 327-1 to a first MCC 228-1-1 (MC0) and a second MCC 228-1-M (MC1). The first MCC 228-1-1 and the second MCC 228-1-M can be coupled to a first PHY memory interface (PHY0) 329-1-1 and a second PHY memory interface 329-1-M (PHY1), as illustrated in FIG. 3A.

The third memory channel datapath circuitry (CH2) 326-2-1 and the fourth memory channel datapath circuitry (CH3) 326-2-M can be coupled via a second multiplexor 327-2 to a third MCC 228-2-1 (MC2) and a fourth MCC 228-2-M (MC3). The third MCC 228-2-1 and the fourth MCC 228-2-M can be coupled to a third PHY memory interface (PHY2) 329-2-1 and a fourth PHY memory interface 329-2-M (PHY3), as illustrated in FIG. 3A.

The fifth memory channel datapath circuitry (CH15) 326-X-1 and the sixth memory channel datapath circuitry (CH16) 326-X-M can be coupled via a third multiplexor 327-M to a fifth MCC 328-X-1 (MC14) and a sixth MCC 328-X-M (MC15). The fifth MCC 328-X-1 and the sixth MCC 328-X-M can be coupled to a fifth PHY memory interface (PHY15) 329-X-1 and a sixth PHY memory interface 329-X-M (PHY3), as illustrated in FIG. 3A. The multiplexors 327 can form at least a portion of the memory channel circuitry 321 in the embodiments illustrated in FIG. 3A.

In various embodiments, the memory controller is configured to operate the channel groups as independent respective reliability, availability, and serviceability (RAS) channels and can disable a sub-channel group within the RAS channel groups, as described herein. Some or all of the memory channels 325 can be included in a channel group such as a RAS channel group. In some embodiments, the memory channel circuitry 321 can be configured to disable at most one memory channel in the respective RAS channel group. Thus, the remainder of the memory channels in the RAS channel group can be utilized for memory operation but an individual memory channel corresponding to a reliability prone chip can be disabled, as described herein.

For example, the first memory channel 325-1-1 and the second memory channel 325-1X can be organized in a channel group (e.g., channel group 240-1, as illustrated in FIG. 2) such as a RAS channel group. Other memory channels (not illustrated in FIG. 3A for ease of illustration) can be included in the channel group. Thus, the first memory channel 325-1-1 and the second memory channel 325-1-M can be organized into a first sub-group of a plurality of sub-groups in the channel group.

A respective sub-group can include memory channels such as two memory channels as illustrated in FIG. 3A. In such embodiments, one of the first memory channel 325-1-1 or the second memory channel 325-1-X in a first sub-group can be disabled. Stated differently, any one of the channels in the first sub-group can be disabled while the remainder of the channels of the first sub-group are enabled or remain enabled. For instance, as illustrated in FIG. 3A, the second memory channel 325-1-M can be disabled and thus can disable (prevent) any memory operations invoking the second memory die 331-1-M (e.g., a reliability prone memory die). Yet, the second memory channel 325-1-1 can be enabled or remain enabled to permit memory operations involving the first memory die 331-1-1. The first memory die 331-1-1 and the second memory die 331-1-M can be physically included in an individual memory chip 332-1.

Similarly, the third memory channel 325-2-1 and the fourth memory channel 325-2-M can be organized into a channel group (e.g., channel group 240-2, as illustrated in FIG. 2) such as a RAS channel group. Other memory channels (not illustrated in FIG. 3A for ease of illustration) can be included in the channel group. As mentioned, the channel group can include a plurality of sub-groups (not illustrated in FIG. 3A for ease of illustration). Thus, the third memory channel 325-2-1 and the fourth memory channel 325-2-M can be organized into a sub-group such as second sub-group.

One of the third memory channel 325-2-1 or fourth memory channel 325-2-X in a second sub-group can be disabled. For instance, as illustrated in FIG. 3A, the third memory channel 325-2-1 can be disabled and thus can disable (prevent) any memory operations invoking the third memory die 331-2-1 (e.g., a reliability prone memory die). Yet, the fourth memory channel 325-2-M can be enabled or remain enabled to permit memory operations involving the fourth memory die 331-2-M. The third memory die 331-2-1 and the fourth memory die 331-2-M can be physically included in an individual memory chip 332-2.

Thus, as described herein at least one channel group can include at least one sub-group which includes a disabled memory channel. As such, memory channel disablement, as described herein, can permit a portion (e.g., a reliability prone a memory dice) included in a chip (e.g., a reliability prone memory chip) in a memory device to be disabled. Thus, the remaining portion (e.g., the remaining memory dice) can be enabled or remain enabled to permit use of a portion of the reliability prone chips. Accordingly, memory devices herein can utilize at least one reliability prone chip that would otherwise be discarded by other approaches.

In the embodiments described in FIG. 3A, a memory channel such as the second memory channel 325-1-X and the third memory channel 325-2-1 can be disabled based on a signal output by a multiplexor. For instance, the second memory channel 325-1-M can be disabled by virtue of disabling the second memory channel datapath circuitry (CH1) 326-1-M associated with the second memory channel 325-1-M.

However, in some embodiments a memory channel can be disabled by altering or swapping respective memory channel datapath circuitry associated with a respective memory channel. For instance, the third memory channel 325-2-1 can be disabled by associating the fourth memory channel datapath circuitry (CH3) 326-2-M with the third memory channel 325-2-1. Stated differently, the third memory channel 325-2-1 can be disabled by swapping via the second multiplexor 327-2 the association of the third memory channel 325-2-1 from the third memory channel datapath circuitry (CH2) 326-2-1 (which is enabled) to the fourth memory channel datapath circuitry (CH3) 326-2-M (which is disabled).

Channel datapath circuitry and/or an associated memory channel can be disabled by reserving the channel datapath circuitry and/or an associated channel (e.g., the third memory channel 325-2-1) as a reserved system channel, among possibilities. Information indicative of the reserved system channel can be conveyed to the memory controller and/or a host coupled to the memory controller such that the memory controller and/or the host does not invoke the reserved memory channel for any memory operations. For instance, as described with respect to FIG. 3B, memory channels associated with PHY1 and PHY2 can be reserved or otherwise disabled (e.g., as indicated by the "X" illustrated in FIG. 3B). Disabling the memory channel can disable (prevent) memory operations invoking each rank included in a memory die associated with the disabled memory channel.

In some embodiments at least some of the channel groups do not include a disabled memory channel. For instance, as illustrated in FIG. 3A, the fifth memory channel 325-X-1 and the sixth memory channel 325-X-M can be organized into a channel group (e.g., channel group 240-3, as illustrated in FIG. 2) such as a RAS channel group. Other memory channels (not illustrated in FIG. 3A for ease of illustration) can be included in the channel group. As mentioned, the channel group can include a plurality of sub-groups (not illustrated in FIG. 3A for ease of illustration). Thus, the fifth memory channel 325-X-1 and the sixth memory channel 325-X-M can be organized into a sub-group such as a third sub-group. As illustrated in FIG. 3A, each of the fifth memory channel 325-X-1 and the sixth memory channel 325-X-M in the third sub-group can be enabled or remain enabled. For instance, as illustrated in FIG. 3A, the fifth memory channel 325-X-1 can be enabled or remain enabled and thus can permit memory operations invoking the fifth memory die 331-X-1. Similarly, the sixth memory channel 325-X-M can be enabled or remain enabled to permit memory operations involving the sixth memory die 331-X-M. The fifth memory die 331-X-1 and the sixth memory die 331-X-M can be physically included in an individual memory chip 332-M.

Figure 3B:
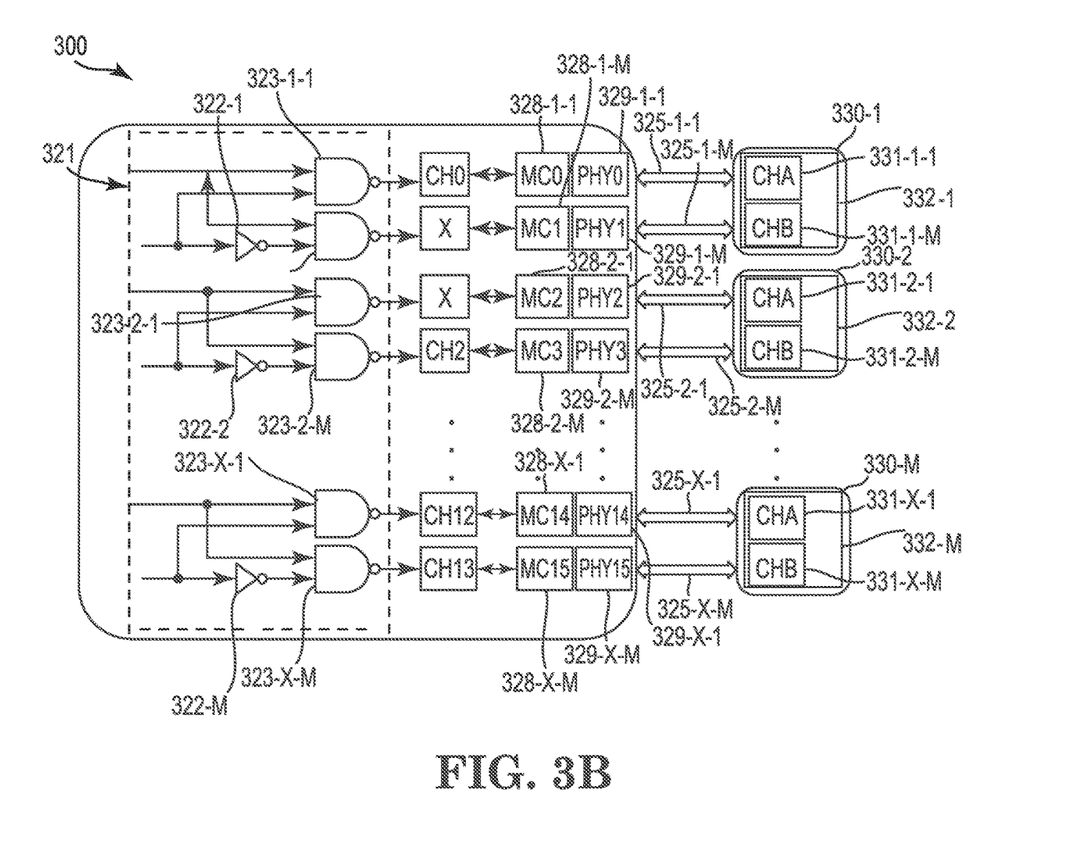
FIG. 3B is a block diagram of a portion of a memory controller having another example of memory channel circuitry in accordance with a number of embodiments of the present disclosure.

FIG. 3B is a block diagram of a portion of a memory controller 300 having another example of memory channel circuitry 321 in accordance with a number of embodiments of the present disclosure. The memory controller 300 is analogous to the memory controller 300 shown in FIG. 3A with the exception that the channel circuitry including multiplexors in FIG. 3A are replaced with separate and independently operated gates and inventers. That is, the gates 323 and/or the inverters can form at least a portion of the memory channel circuitry 321, as illustrated in FIG. 3B.

For instance, each memory channel 325-1-1, 325-1M, 325-2-1, 325-2-M, ... 325-3-X-1, and 325-X-M can have a corresponding gate 323-1-1, 323-1M, 323-2-1, 323-2-M, ... 323-3-X-1, and 323-X-M (collectively referred to as gates 323), respectively. That is, each of the memory channels can be a dedicated memory channel that is associated with a memory die via an individual. Thus, unlike the embodiments in FIG. 3A, each memory channel can be associated with the same memory die (e.g., is not configured to be swapped with another memory channel via a multiplexor). As illustrated in FIG. 3B, the gates can be NAND gates, among other possibilities.

The channel circuitry can further include an inverter. For instance, groups of the gates 323 can be coupled to a corresponding inverter. For example, gates 323-1-1, 323-1M can be coupled to a first invertor 322-1, gates 323-2-1, 323-2-M can be coupled to a second invertor 322-2, and gates 323-3-X-1, 323-X-M can be coupled to a third invertor 322-3.

The gates 323 can be configured to selectively disable a corresponding memory channel and/or enable a corresponding memory channel. The memory channels can be selectively disabled by changing an output of a gate. For instance, a gate outputting a logical "1" can enable a respective memory channel whereas a gate outputting a logical "0" can disable a respective memory channel, among other possibilities. Information indicative of the disabled memory channel can be conveyed to the memory controller and/or a host such that that memory controller and/or the host does not invoke the disabled memory channel for any memory operations.

For instance, a first gate 323-1-1 and a second gate 323-1M can selectively disable or enable a first memory channel 325-1-1 and a second memory channel 325-1-M, respectively. Thus, some but not all of a quantity of memory dice in a given chip in a memory device 330 can be selectively disabled. For example, the first memory channel 325-1 associated with a first memory die 331-1-1 in a respective memory device such as the first memory device 330-1 of the memory devices 330. Subsequent to selectively disabling the first memory channel 325-1-1, a memory operation (e.g., a read operation, a write operation, etc.) can be performed via a second memory channel 325-1-M of a respective sub-group involving a second memory die 331-1-M in the respective memory device.

Figure 4:
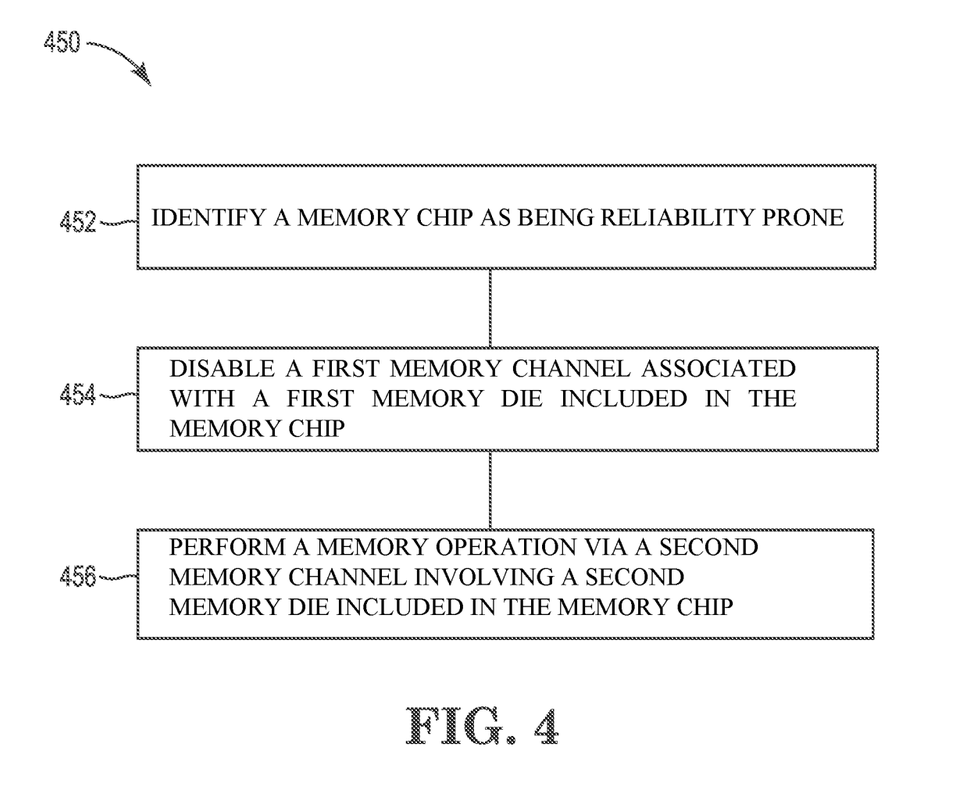
FIG. 4 is a flow diagram corresponding to a method for memory channel disablement in accordance with some embodiments of the present disclosure.

FIG. 4 is a flow diagram corresponding to a method 450 for memory channel disablement in accordance with some embodiments of the present disclosure.

The method 450 can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. In some embodiments, the method 450 is performed by the memory controllers described herein. Although shown in a particular sequence or order, unless otherwise specified, the order of the processes can be modified. Thus, the illustrated embodiments should be understood only as examples, and the illustrated processes can be performed in a different order, and some processes can be performed in parallel. Additionally, one or more processes can be omitted in various embodiments. Thus, not all processes are required in every embodiment. Other process flows are possible.

At 452, a memory device, a memory chip, and/or a memory die can be identified as being reliability prone based on initial reliability testing of the memory device, the memory chip and/or the memory die. For instance, a memory chip including memory dice can be identified as being reliability prone based on initial reliability testing of the memory chip. Examples of initial reliability testing include reliability testing the involves writing and reading test data to a memory die included in a memory chip and/or determining a threshold voltage (e.g., a threshold erase voltage, etc.) associated with a memory chip and/or memory die included in a memory chip, among other possibilities. For instance, in various embodiments the initial reliability testing can determine that a memory chip has a reliability attribute that does not meet (e.g., is less than or equal to a reliability criterion) and as such the memory chip can be determined to be reliability prone (e.g., being more reliability prone than other memory chips and/or being non-functional). That is, in some embodiments, a portion (e.g., and individual memory die) included in a reliability prone memory chip can be non-functional (e.g., does not permit storage/retention of data) due to manufacturing defects, etc.

In some embodiments, a reliability prone memory chip can be positioned at a designated (e.g., predetermined) physical position in a memory device and/or a memory-subsystem including a memory device. For instance, a reliability prone chip can be positioned as designated location that is to couple to a designated PHY memory associated with a designated memory channel which can be selectively disabled. As mentioned, have a designated memory channel that can be selectively disabled (and positioning a reliability prone chip in a corresponding location) can reduce a quantity of memory channel circuitry included in a memory controller and yet can permit a memory die included in the reliability prone memory chip to be selectively disabled, as described herein. In some embodiments, a reliability prone memory chip can be positioned at a designated physical position in a multi-chip package included in a memory device.

At 454, responsive to determining the given chip and/or memory die is reliability prone, a memory channel associated with the reliability prone memory chip and/or memory die can be disabled, as described herein. For instance, a first memory channel associated with a first memory die in a reliability prone memory chip can be selectively disabled.

At 456, a memory operation can be performed via a second memory channel of the respective sub-group involving a second memory die in the reliability prone memory device and/or reliability prone memory device. For instance, the memory operation can be performed subsequent to selectively disabling the first memory channel. Thus, memory operations can be performed that invoke some but not all memory dice in a reliability prone memory chip and/or a reliability prone memory device, as described herein.

Various methods described herein can be performed by processing logic that can include hardware (e.g., processing device, circuitry, dedicated logic, programmable logic, microcode, hardware of a device, integrated circuit, etc.), software (e.g., instructions run or executed on a processing device), or a combination thereof. Unless otherwise specified, the order of the processes can be modified. Thus, the illustrated embodiments should be understood only as examples, and the described processes can be performed in a different order, and some processes can be performed in parallel. Additionally, one or more processes can be omitted in various embodiments. Thus, not all processes are required in every embodiment. Other process flows are possible.

Although specific embodiments have been illustrated and described herein, those of ordinary skill in the art will appreciate that an arrangement calculated to achieve the same results can be substituted for the specific embodiments shown. This disclosure is intended to cover adaptations or variations of one or more embodiments of the present disclosure. It is to be understood that the above description has been made in an illustrative fashion, and not a restrictive one. Combination of the above embodiments, and other embodiments not specifically described herein will be apparent to those of skill in the art upon reviewing the above description. The scope of the one or more embodiments of the present disclosure includes other applications in which the above structures and processes are used. Therefore, the scope of one or more embodiments of the present disclosure should be determined with reference to the appended claims, along with the full range of equivalents to which such claims are entitled.

In the foregoing Detailed Description, some features are grouped together in a single embodiment for the purpose of streamlining the disclosure. This method of disclosure is not to be interpreted as reflecting an intention that the disclosed embodiments of the present disclosure have to use more features than are expressly recited in each claim. Rather, as the following claims reflect, inventive subject matter lies in less than all features of a single disclosed embodiment. Thus, the following claims are hereby incorporated into the Detailed Description, with each claim standing on its own as a separate embodiment.

What is claimed is:

1. An apparatus, comprising:
    a plurality of memory devices comprising memory chips having memory dice; and
    a memory controller coupled to the plurality of memory devices via memory channels, wherein each memory device of the plurality of memory devices is a multi-channel memory device comprising at least two memory chips located therein that are coupled to different respective first and second memory channels, and wherein the memory controller is configured to:
        selectively disable one of the first memory channel or the second memory channel of a particular memory device due to a determination that a memory die within a memory chip associated with the one of the first memory channel or the second memory channel does not satisfy a reliability criterion; and
        subsequent to disabling the one of the first memory channel or the second memory channel, perform a memory operation via the other of the first memory channel or the second memory channel.

2. The apparatus of claim 1, wherein the memory controller is configured to disable the one of the first memory channel or the second memory channel prior to being coupled to the memory chip.

3. The apparatus of claim 1, wherein the reliability criterion is associated with the presence of manufacturing defects.

4. The apparatus of claim 1, further comprising a multiplexor, and wherein the first memory channel is a configurable channel that can be associated via the multiplexor with a first memory die of a memory chip associated with the first memory channel.

5. The apparatus of claim 1, wherein the first memory channel and the second memory channel are included in a designated sub-group configured to be disabled.

6. The apparatus of claim 5, wherein at least one of but not all of the memory channels in the designated sub-group are configured to be disabled.

7. The apparatus of claim 5, wherein each memory channel in the designated sub-group is configured to be disabled.

8. The apparatus of claim 5, wherein the designated sub-group includes a total of at least two memory channels.

9. A memory controller, comprising:
a front end portion configured to be coupled to a host via an interface to:
receive memory access requests from the host; and
provide memory access responses to the host;
a back end portion configured to be coupled to a plurality of multi-channel memory devices via a plurality of memory channels, wherein the plurality of memory channels are organized as a plurality of channel groups, and wherein each multi-channel memory device of the plurality of multi-channel memory devices comprises at least two memory chips located therein that are coupled to different respective first and second memory channels; and
memory channel circuitry configured to, prior to a memory access request being received from the host and responsive to a determination that a memory die within a memory chip of a particular one of the plurality of multi-channel memory devices has a reliability issue, disable the memory channel corresponding to the memory chip of the particular one of the plurality of multi-channel memory devices; and
wherein the memory controller is configured to, while the memory channel corresponding to the memory chip of the particular one of the plurality of multi-channel memory devices is disabled, perform a memory operation via a different memory channel corresponding to a different memory chip of the particular one of the plurality of multi-channel memory devices.

10. The memory controller of claim 9, wherein the memory channel circuitry includes a logical gate or a multiplexor.

11. The memory controller of claim 9, wherein the plurality of channel groups further comprise a plurality of independent respective channel groups.

12. The memory controller of claim 9, wherein the memory channel circuitry is further configured to disable at most one memory channel in a respective channel group of the plurality of channel groups.

13. The memory controller of claim 9, wherein each memory channel is a low-power double data rate (LPDDRx) memory channel.

14. The memory controller of claim 9, wherein the reliability issue relates to data retention.

15. The memory controller of claim 9, wherein the memory channel circuitry is located in a central controller portion, the back end portion, or both.

16. A system comprising:
a plurality of multi-channel memory devices; and
a memory controller comprising:
a front end portion configured to be coupled to a host via an interface to:
receive memory access requests from a host in accordance with a compute express link (CXL) protocol; and
provide memory access responses to the host in accordance with the CXL protocol;
a back end portion configured to be coupled to the plurality of multi-channel memory devices via a plurality of memory channels, wherein the plurality of memory channels are organized as a plurality of channel groups, wherein each channel group is organized into a plurality of sub-groups including at least two memory channels, and wherein the at least two memory channels of each sub-group of the plurality of sub-groups are coupled to different respective memory chips within a same one of the plurality of multi-channel memory devices; and
memory channel circuitry configured to, responsive to a determination that a memory die of particular memory chip within a particular multi-channel memory devices does not meet a reliability criterion, selectively disable the memory channel corresponding to the particular memory chip within the multi-channel memory device while maintaining remaining memory channels corresponding to the particular multi-channel memory device in an enabled state.

17. The system of claim 16, wherein each memory channel has a same channel width.

18. The system of claim 17, wherein each memory channel has a 8-bit width or 16-bit width.

19. The system of claim 16, wherein each multi-channel memory device of the plurality of multi-channel memory devices includes a multi-chip package including a plurality of memory chips.

* * * * *